United States Patent
Park et al.

(10) Patent No.: US 8,188,623 B2
(45) Date of Patent: May 29, 2012

(54) LINEAR VIBRATION MOTOR

(75) Inventors: Seok Jun Park, Gyunggi-do (KR); Jun Kun Choi, Gyunggi-do (KR); Jae Woo Jun, Gyunggi-do (KR); Hwa Young Oh, Seoul (KR); Je Hyun Bang, Gyunggi-do (KR); Kwang Hyung Lee, Gyunggi-do (KR); Yong Jin Kim, Gyunggi (KR); Kyung Ho Lee, Gyunggi-do (KR)

(73) Assignee: Samsung Electro-Mechanics Co., Ltd., Suwon, Gyunggi-Do (KR)

( * ) Notice: Subject to any disclaimer, the term of this patent is extended or adjusted under 35 U.S.C. 154(b) by 273 days.

(21) Appl. No.: 12/718,466

(22) Filed: Mar. 5, 2010

(65) Prior Publication Data
US 2011/0001365 A1   Jan. 6, 2011

(30) Foreign Application Priority Data
Jul. 1, 2009   (KR) .................. 10-2009-0059858

(51) Int. Cl.
*H02K 33/00*   (2006.01)
*H02K 35/00*   (2006.01)

(52) U.S. Cl. ....... 310/15; 310/17; 310/12.01; 310/12.31

(58) Field of Classification Search ............ 310/15, 310/17, 51, 89, 12.01, 12.31
See application file for complete search history.

(56) References Cited

U.S. PATENT DOCUMENTS

| | | | | |
|---|---|---|---|---|
| 3,525,887 A * | 8/1970 | Ewart, Jr | | 310/27 |
| 6,530,756 B2 * | 3/2003 | Morita et al. | | 417/417 |
| 6,958,553 B2 * | 10/2005 | Ichii et al. | | 310/15 |
| 6,991,217 B2 * | 1/2006 | Shimizu et al. | | 251/284 |
| 7,385,317 B2 * | 6/2008 | Sugita et al. | | 310/12.15 |
| 7,495,358 B2 * | 2/2009 | Kobayashi et al. | | 310/36 |
| 7,859,144 B1 * | 12/2010 | Sahyoun | | 310/15 |
| 2001/0017490 A1 * | 8/2001 | Suzuki et al. | | 310/12 |
| 2002/0195884 A1 * | 12/2002 | Ichii et al. | | 310/15 |
| 2004/0130221 A1 * | 7/2004 | Ichii et al. | | 310/12 |
| 2004/0256918 A1 * | 12/2004 | Beakley | | 310/12 |
| 2009/0085359 A1 * | 4/2009 | Mabuchi et al. | | 290/1 R |
| 2010/0327673 A1 * | 12/2010 | Jun et al. | | 310/25 |
| 2011/0006618 A1 * | 1/2011 | Lee et al. | | 310/25 |
| 2011/0012441 A1 * | 1/2011 | Oh et al. | | 310/25 |
| 2011/0101797 A1 * | 5/2011 | Lee et al. | | 310/29 |
| 2011/0133577 A1 * | 6/2011 | Lee | | 310/15 |

FOREIGN PATENT DOCUMENTS

| | | | |
|---|---|---|---|
| EP | 1309073 A2 * | 5/2003 | |
| JP | 08116658 A * | 5/1996 | |
| JP | 2003211088 A * | 7/2003 | |
| JP | 2004073983 A * | 3/2004 | |

* cited by examiner

Primary Examiner — Quyen Leung
Assistant Examiner — Alex W Mok
(74) *Attorney, Agent, or Firm* — Blakely Sokoloff Taylor & Zafman LLP

(57) ABSTRACT

Disclosed herein is a linear vibration motor. The motor includes a casing surrounding the top and widthwise side of the motor, and a bracket surrounding the bottom and lengthwise side of the motor. A plate is provided on an inner surface of a side of the bracket and integrally has a cylindrical part to accommodate a coil. A mass body is provided in a central portion of the bracket and vibrates horizontally, a yoke is provided on a side surface of the mass body, and a magnet is mounted to a central portion of the yoke to be inserted into an internal space of the coil. A spring couples the plate with the yoke, thus transmitting vibratory force to the motor. An extension part extends from an end of the spring, and a bearing is provided on an end of the extension part, thus minimizing friction with the casing.

7 Claims, 8 Drawing Sheets

LINEAR VIBRATION MOTOR

CROSS REFERENCE TO RELATED ED APPLICATION(S)

This application claims the benefit of Korean Patent Application No. 10-2009-0059858, filed on Jul. 1, 2009, entitled "LINEAR VIBRATION MOTOR", which is hereby incorporated by reference in its entirety into this application.

BACKGROUND OF THE INVENTION

1. Technical Field

The present invention relates generally to a linear vibration motor and, more particularly, to a linear vibration motor, in which a bearing is provided on an extension part of a spring coupling a motion part and a stationary part of the motor with each other, or a ball is provided on a protruding part of a yoke, thus minimizing friction and abrasion between adjacent parts when the motor is in operation, minimizing noise caused by the friction and abrasion thereof, and vibrating in a horizontal direction.

2. Description of the Related Art

The most important function of a receiving device, the representative example of which is a mobile phone, is a receiving function informing the receipt of a signal. This function is performed through the production of the sound of a bell or vibration. The vibration especially becomes an essential element of the mobile phone so as to prevent people from being annoyed or to allow the recognition of the receipt of a signal at a position where it is difficult to recognize the sound of the bell.

A vibration motor is a means for generating vibration and is constructed so that its axis is eccentric or the center of gravity leans to one side and thereby the motor generates vibration when the motor rotates. Such a vibration motor is problematic in that a brush passes through a gap between segments when the motor rotates, so that mechanical friction and electric sparks are generated, and the lifespan of the motor is short. Further, when voltage is applied to the motor, it takes a long time to reach a target vibration strength because of rotating inertia, so that it is difficult to realize vibration suitable for a touch screen phone.

In order to overcome the drawbacks of the vibration motor, a linear vibration motor has been developed. In the linear vibration motor, a vibrator mounted to a plate spring is vibrated by electromagnetic force between a magnet and a coil, so that mechanical friction does not occur and the miniaturization of the motor is possible. Therefore, a variety of types of linear vibration motors are being currently developed. Here, the electromagnetic force is generated by interaction between a magnet located in a motion part and DC or AC having a predetermined frequency of a coil located in a stator.

As shown in FIG. 11, a conventional linear vibration motor 10 includes a vibrator 12, a coil 13, a magnet 14, a plate 15, and a yoke 16 in a casing 11. The vibrator 12 is vibrated up and down by electromagnetic force between the coil 13 and the magnet 14.

The linear vibration motor is generally located at the corner of a mobile phone, thus generating vibration on an LCD screen in a vertical direction. The linear vibration motor designed to vibrate in the vertical direction may generate vibration when the vibrator 12 ensures vertical displacement and moves. However, the increase in the thickness necessary to increase the vibration strength is limited because of the restriction of a mounting space in the mobile phone.

In order to overcome the drawback of the conventional linear vibration motor 100, a method of horizontally moving a mass part in the linear vibration motor has been proposed.

However, the linear vibration motor vibrating horizontally is problematic in that parts are apt to wear because of friction between the vibrator 12 and adjacent parts. Therefore, the development of a linear vibration motor which is capable of reducing the abrasion of parts while vibrating horizontally is pressing.

SUMMARY OF THE INVENTION

The present invention has been made in an effort to provide a linear vibration motor, in which a bearing is provided on an extension part of a spring coupling a motion part and a stationary part of the motor with each other, or a ball is provided on a protruding part of a yoke, thus minimizing friction and abrasion between adjacent parts when the motor is in operation, minimizing noise caused by the friction and abrasion, and vibrating in a horizontal direction.

In a linear vibration motor according to an embodiment of the present invention, a casing surrounds a top and a widthwise side of the motor, and a bracket surrounds a bottom and a lengthwise side of the motor. A plate is provided on an inner surface of a side of the bracket and integrally has a cylindrical part to accommodate a coil therein. A mass body is provided in a central portion of the bracket and vibrates in a horizontal direction, a yoke is provided on a side surface of the mass body, and a magnet is mounted to a central portion of the yoke to be inserted into an internal space of the coil. A spring couples the plate with the yoke, thus transmitting vibratory force to the motor. An extension part extends from an end of the spring, and a bearing is provided on an end of the extension part, thus minimizing friction with the casing.

The bearing is a ball bearing having the shape of a ball, a cylinder bearing having the shape of a cylinder, or a ring bearing having the shape of a ring.

Further, the casing includes a stepped rail to guide the bearing.

The yoke includes a protruding part extending from an edge of the yoke, and a ball provided on an end of the protruding part to minimize a frictional surface between the mass body and the casing when the mass body is in operation.

The casing includes a stepped rail to guide the ball of the protruding part.

DESCRIPTION OF THE PREFERRED EMBODIMENTS

Hereinafter, linear vibration motors 100 according to the preferred embodiments of the present invention will be described in detail with reference to the accompanying drawings.

Figure 1:
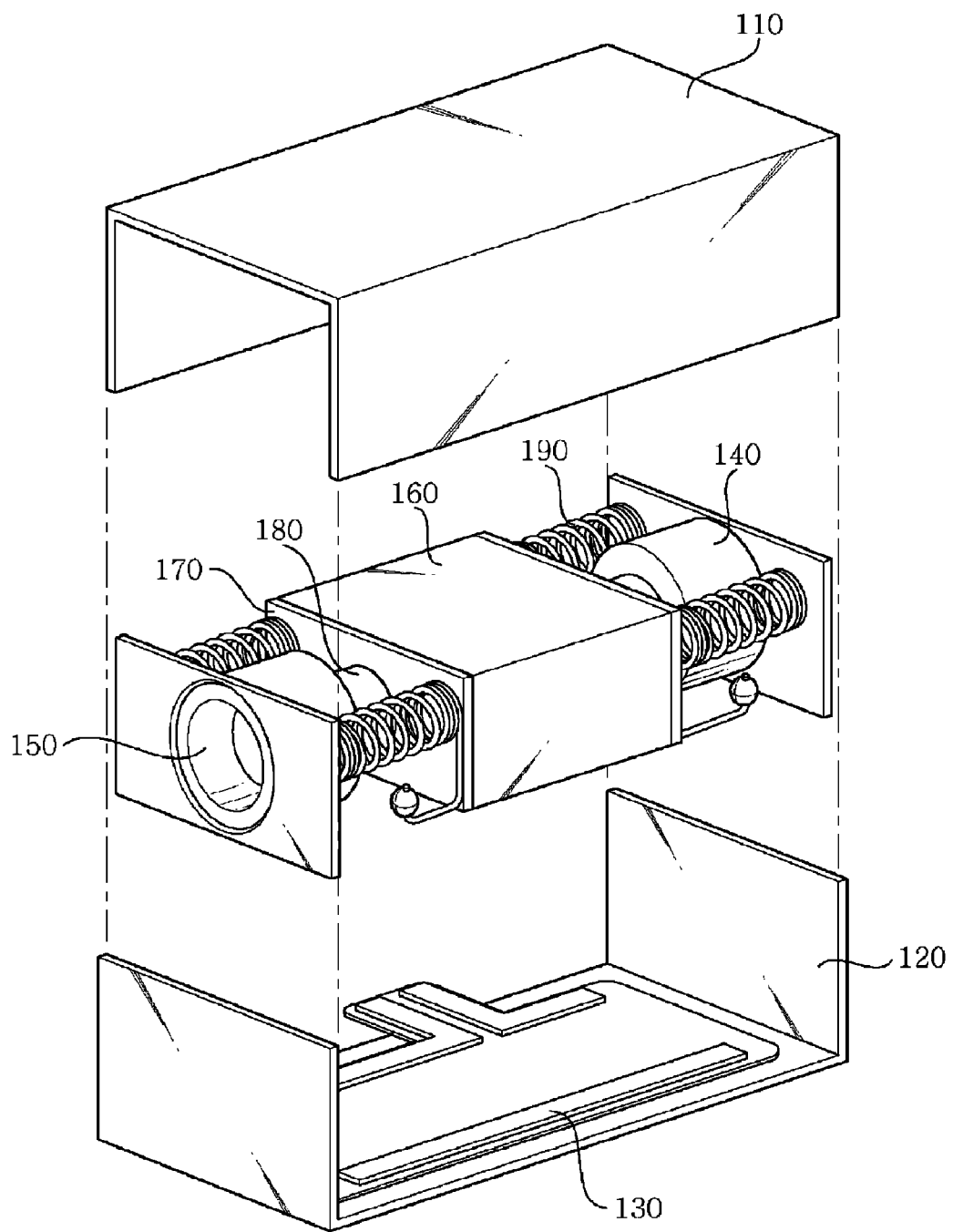
FIG. 1 is an exploded perspective view illustrating a linear vibration motor according to the present invention.
Figure 2:
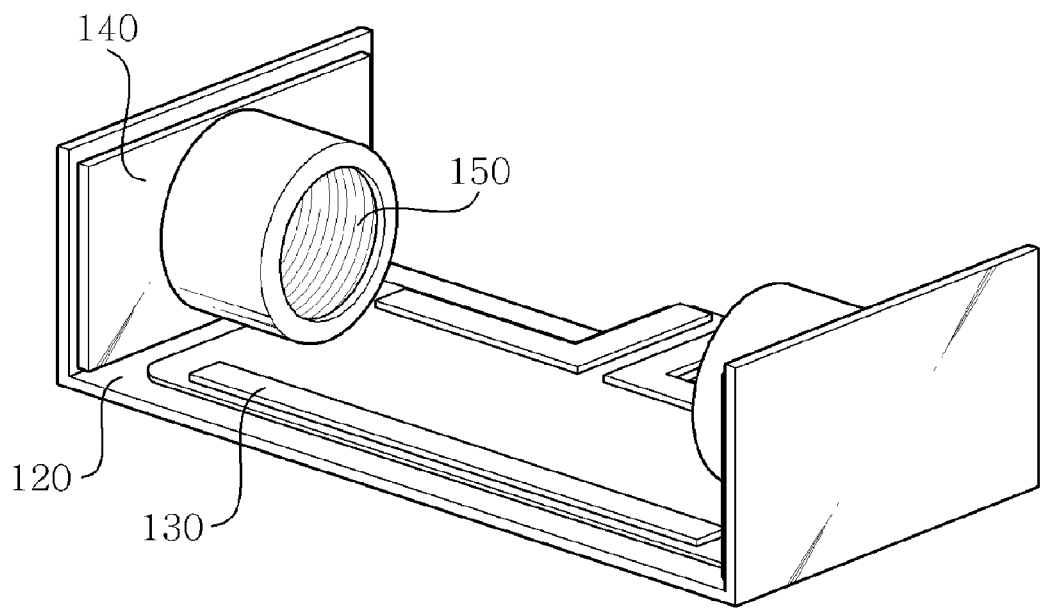
FIG. 2 is a perspective view illustrating a stationary part of the linear vibration motor according to the present invention.
Figure 3:
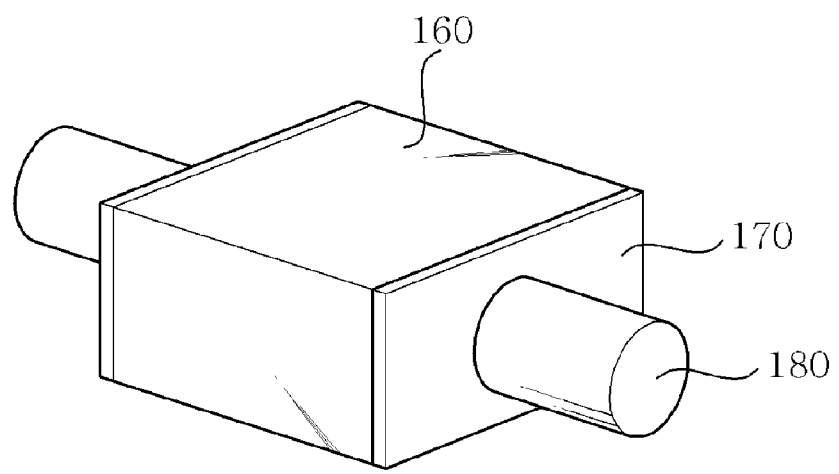
FIG. 3 is a perspective view illustrating a motion part of the linear vibration motor according to the present invention.

As shown in FIGS. 1 to 3, a linear vibration motor 100 according to the present invention includes a casing 110, a bracket 120, an FPC 130, plates 140, coils 150, a mass body 160, yokes 170, magnets 180, and springs 190.

The casing 110 is mounted to surround the top and widthwise sides of the linear vibration motor 100, thus protecting the linear vibration motor 100 from external impact.

The bracket 120 is shaped to surround the bottom and lengthwise sides of the linear vibration motor 100. The bracket 120 is made of a non-magnetic or weakly magnetic substance so as not to affect a drive unit, and the FPC 130 connected to an input terminal is mounted on the bottom in the bracket 120. The FPC 130 includes a pattern which connects power, applied from the exterior, to the coils 150.

Each plate 140 is mounted to the inner surface of a side of the bracket 120 and integrally has a cylindrical part to accommodate an associated coil 150 therein.

Each coil 150 interacts with an associated magnet 180 to generate electromagnetic force.

The bracket 120, the FPC 130 mounted on the bracket 120, the plates 140 and the coils 150 are fixed and constitute the stationary part of the linear vibration motor 100.

The mass body 160 is provided in the center of the bracket 120 to generate vibration in a horizontal direction. The mass body 160 interacts with the magnets 180 in response to the power signal of the coils 150, thus generating vibration in the horizontal direction.

Preferably, the mass body 160 has a specific gravity which is heavier than iron (Fe).

Generally, in the linear vibration motor using resonance frequency F, as shown in the following [Equation 1], the resonance frequency F is determined by the mass of the mass body 160 and the elastic modulus k of the springs. When power having the resonance frequency F is applied to the coils 150 and current flows in the coils 150, the horizontal displacement and vibration of the mass body 160 have maximum values.

$$F = \frac{1}{2\pi}\sqrt{\frac{k}{m}}$$ [Equation 1]

The plate-shaped yokes 170 are mounted to both sides of the mass body 160, with the magnet 180 provided on the central portion of each yoke 170. The magnet 180 is inserted into the internal space of each coil 150 which is installed in the cylindrical part of each plate 140.

Each yoke 170 forms a magnetic circuit together with the associated magnet 180 to optimize the magnetic flux of the magnet 180 which interlinks with the associated coil 150.

The mass body 160, the yokes 170 mounted to the mass body 160, and the magnets 180 constitute the motion part of the linear vibration motor 100.

The springs 190 couple the yokes 170 mounted to the mass body 160 with the plates 140, and transmit vibratory force to the casing 110 and the bracket 120 when the mass body 160 moves in a horizontal direction. Both ends of each spring 190 are secured, respectively, to the associated yoke 170 and plate 140 through welding.

An extension part 191 extends from an end of each spring 190 in such a way as to be integrated with the spring 190, and a ball bearing 192 is provided on an end of the extension part 191, thus minimizing a frictional surface between the mass body 160 and the casing 110 when the mass body 160 vibrates and always guaranteeing a minimum gap between the mass body 160 and the casing 110. Thereby, the abrasion of the casing 110 or abrasion between the mass body 160 and adjacent parts are minimized, and noise caused by touching is prevented.

The extension part 191 is made of the same material as the spring 190 and has elasticity. An additional part is not required to assemble the ball bearing 192 with the extension part 191.

As such, the ball bearing 192 is provided on the end of the extension part 191 of the spring 190, thus maximizing mass m of the mass body 120, achieving the miniaturization of the vibration motor and maximizing the vibration strength of the motor.

Figure 4:
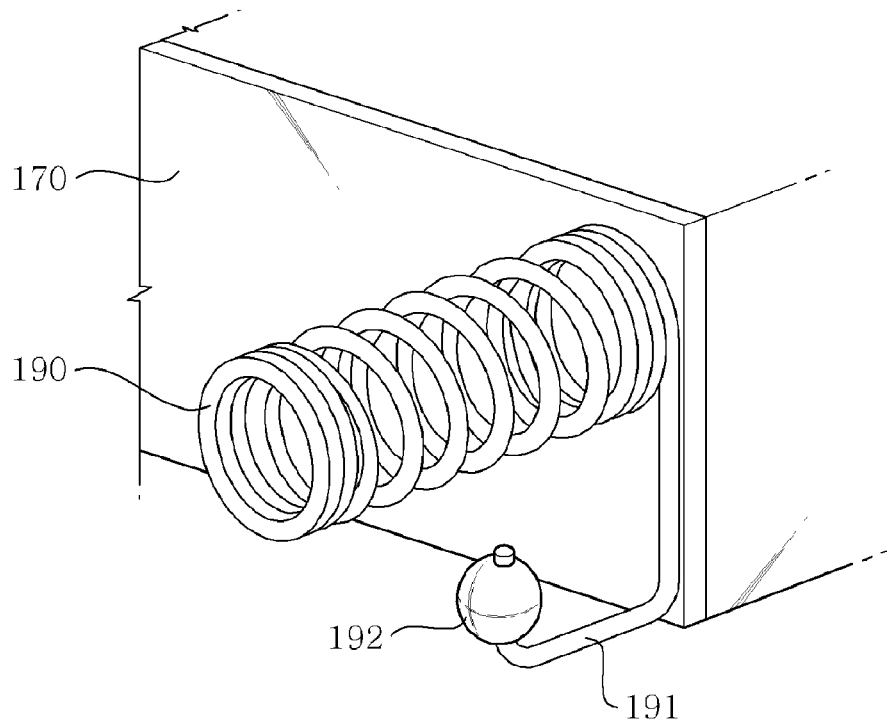
FIG. 4 is a perspective view illustrating part of a linear vibration motor according to a first embodiment of the present invention.
Figure 5:
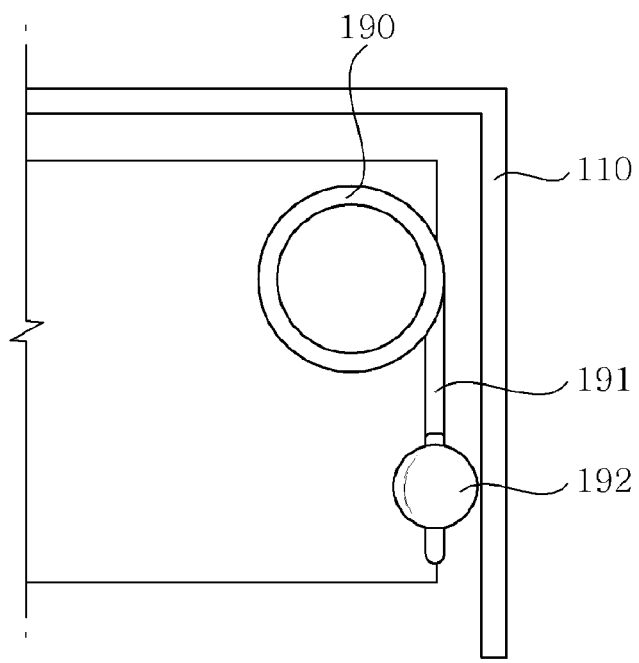
FIG. 5 is a sectional view illustrating the linear vibration motor according to the first embodiment of the present invention.

FIGS. 4 and 5 are views illustrating the ball bearing 192 according to the first embodiment of the present invention, in which the ball bearing 192 is assembled with the extension part 191 of the spring 190. In this regard, the ball bearing 192 has the shape of a ball, thus minimizing a frictional area between the mass body 160 and the casing 110 when the mass body 160 is in operation, and preventing the abrasion of parts.

Figure 6:
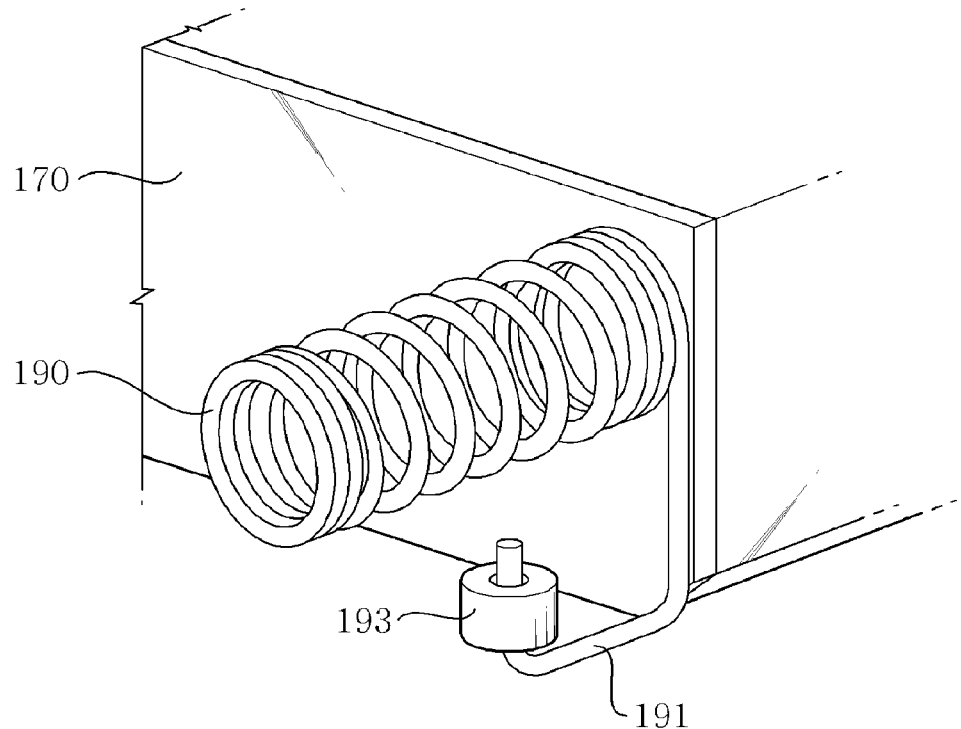
FIG. 6 is a perspective view illustrating part of a linear vibration motor according to a second embodiment of the present invention.
Figure 7:
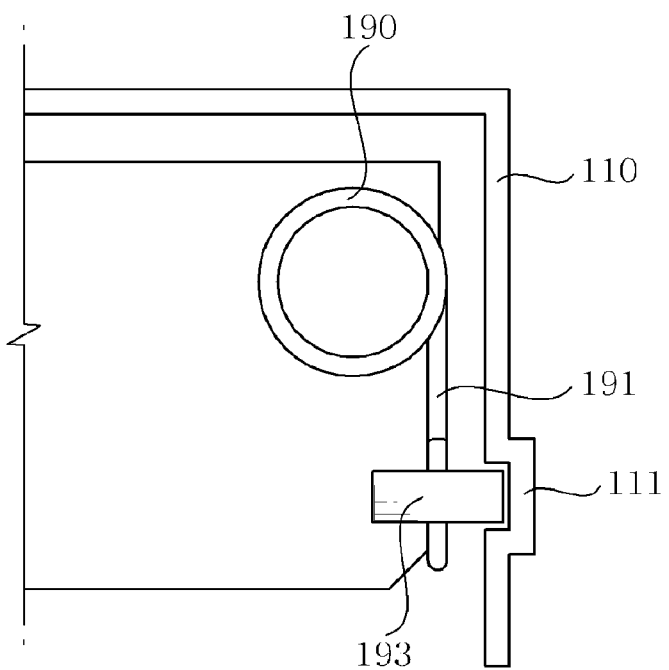
FIG. 7 is a sectional view illustrating the linear vibration motor according to the second embodiment of the present invention.

FIGS. 6 and 7 are views illustrating a cylinder bearing 193 according to the second embodiment of the present invention, in which the cylinder bearing 193 is assembled with the extension part 191 of the spring 190. A stepped rail 111 is provided in a portion of a casing 110 which contacts the cylinder bearing 193, thus guiding the cylinder bearing 193 and ensuring the straightness of the mass body 120 which moves horizontally.

Figure 8:
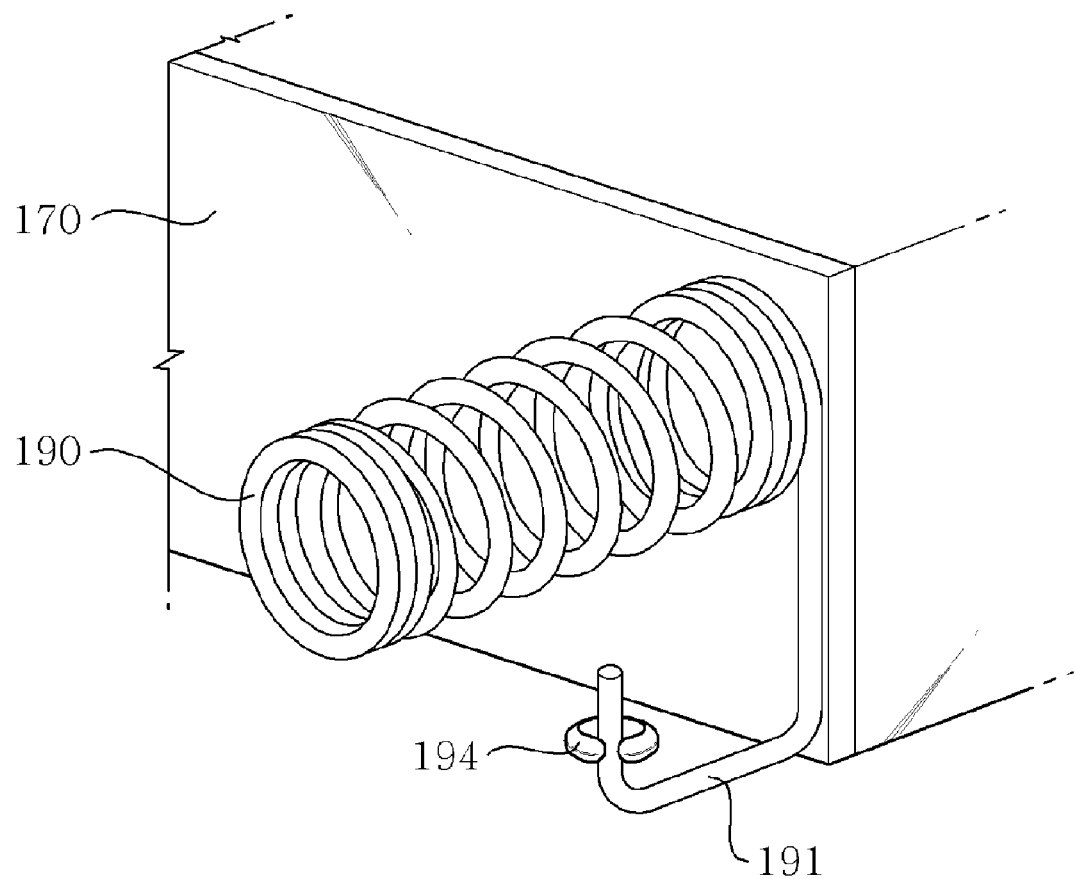
FIG. 8 is a perspective view illustrating part of a linear vibration motor according to a third embodiment of the present invention.

FIG. 8 is a view illustrating a ring bearing 194 according to the third embodiment of the present invention, in which the ring bearing 194 is assembled with the extension part 191 of the spring 190.

As shown in FIGS. 4 to 8, any one of the ball bearing 192, the cylinder bearing 193, and the ring bearing 194 may be provided on the end of the extension part 191 of the spring 190.

Figure 9:
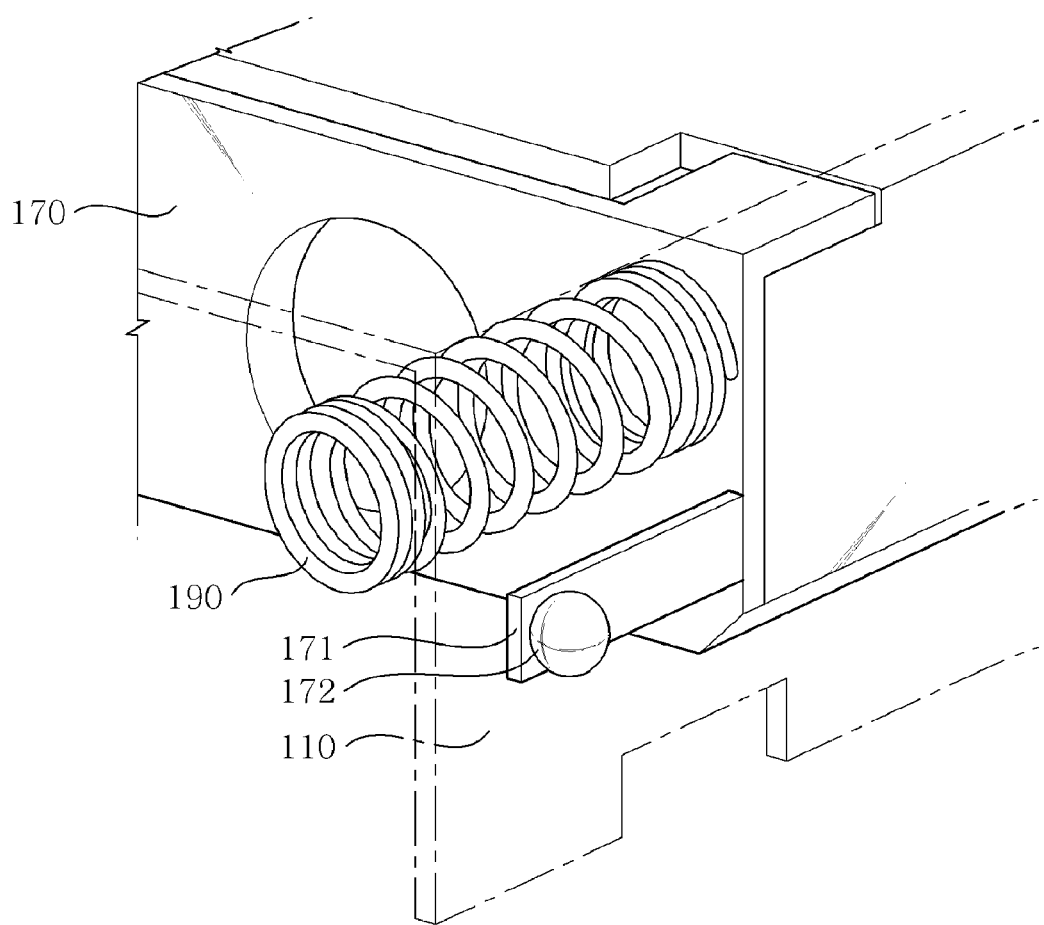
FIG. 9 is a perspective view illustrating a linear vibration motor according to a fourth embodiment of the present invention.

Further, according to the fourth embodiment, as shown in FIG. 9, a protruding part 171 extends from the edge of the yoke 170, and a ball 171 is mounted to an end of the protruding part 171, thus minimizing a frictional surface between the mass body 160 and the casing 110 when the mass body 160 is in operation.

Figure 10:
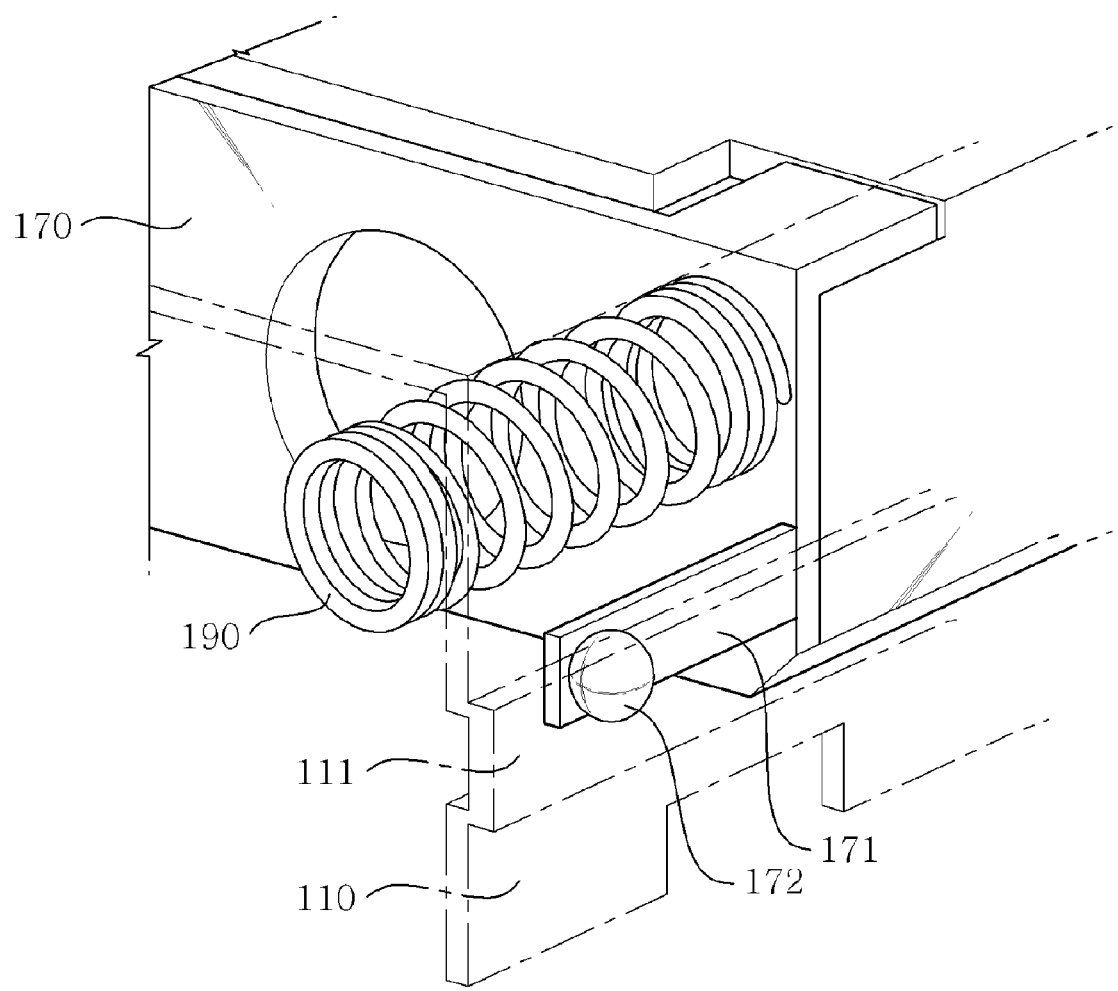
FIG. 10 is a perspective view illustrating a linear vibration motor according to a fifth embodiment of the present invention.
Figure 11:
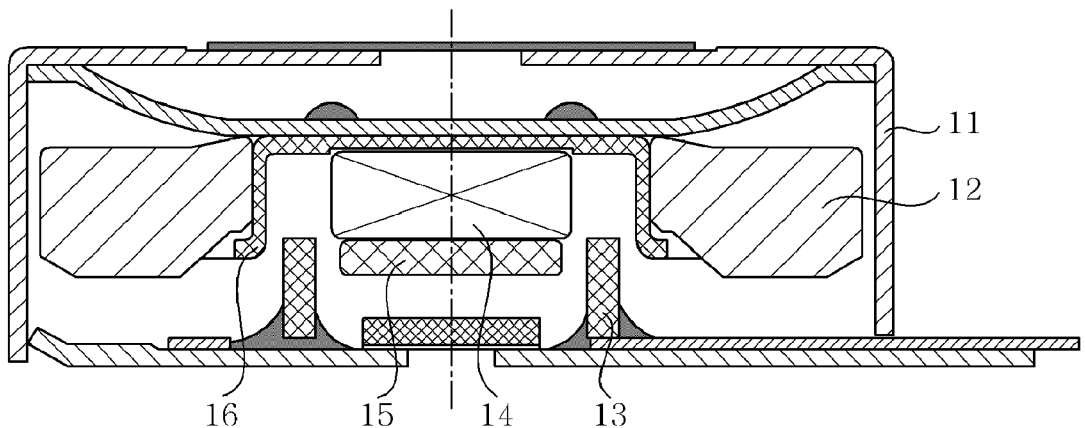
FIG. 11 is a sectional view illustrating a conventional vibration motor.

FIG. 10 illustrates the fifth embodiment of the present invention, in which a motor includes a casing 110 having a stepped rail 111. According to this embodiment, when the mass body 160 moves horizontally, a ball 172 provided on an end of a protruding part 171 which extends from the edge of the yoke 170 moves along the rail 111, thus minimizing a frictional surface between the mass body 160 and the casing 110.

As such, the linear vibration motor 100 according to the present invention vibrates in a horizontal direction, and includes the bearing on the end of the extension part 191 of the spring 190, thus minimizing friction and abrasion between adjacent parts, and minimizing noise caused by the friction and abrasion.

As described above, the present invention provides a linear vibration motor, in which a bearing is provided on an extension part of a spring coupling a motion part and a stationary part of the motor with each other, thus minimizing friction and abrasion between adjacent parts when the motor is in operation, minimizing noise caused by the friction and abrasion, and vibrating in a horizontal direction. Further, a protruding part is provided on a yoke and a ball is provided on the protruding part, thus minimizing a frictional area between adjacent parts when the motor is in operation.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A linear vibration motor, comprising:
   a casing surrounding a top and a widthwise side of the motor, and a bracket surrounding a bottom and a lengthwise side of the motor;
   a plate provided on an inner surface of a side of the bracket and integrally having a cylindrical part to accommodate a coil therein;
   a mass body provided in a central portion of the bracket and vibrating in a horizontal direction, a yoke provided on a side surface of the mass body, and a magnet mounted to a central portion of the yoke to be inserted into an internal space of the coil;
   a spring coupling the plate with the yoke, thus transmitting vibratory force to the motor; and
   an extension part extending from an end of the spring, and a bearing provided on an end of the extension part, thus minimizing friction with the casing.

2. The linear vibration motor as set forth in claim 1, wherein the bearing comprises a ball bearing having a shape of a ball.

3. The linear vibration motor as set forth in claim 1, wherein the bearing comprises a cylinder bearing having a shape of a cylinder.

4. The linear vibration motor as set forth in claim 1, wherein the bearing comprises a ring bearing having a shape of a ring.

5. The linear vibration motor as set forth in claim 1, wherein the casing comprises a stepped rail to guide the bearing.

6. The linear vibration motor as set forth in claim 1, wherein the yoke comprises:
   a protruding part extending from an edge of the yoke; and
   a ball provided on an end of the protruding part to minimize a frictional surface between the mass body and the casing when the mass body is in operation.

7. The linear vibration motor as set forth in claim 6, wherein the casing comprises a stepped rail to guide the ball of the protruding part.

\* \* \* \* \*